(12) United States Patent
Davis et al.

(10) Patent No.: US 6,787,577 B2
(45) Date of Patent: Sep. 7, 2004

(54) PROCESS FOR THE PRODUCTION OF HIGHLY BRANCHED FISCHER-TROPSCH PRODUCTS AND POTASSIUM PROMOTED IRON CATALYST

(75) Inventors: Burtron H. Davis, Georgetown, KY (US); Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/400,089

(22) Filed: Mar. 25, 2003

(65) Prior Publication Data

US 2003/0203982 A1 Oct. 30, 2003

Related U.S. Application Data

(63) Continuation-in-part of application No. 10/080,148, filed on Feb. 19, 2002, now abandoned.

(51) Int. Cl.⁷ .......................... C07C 27/00; C07C 2/02; C07C 2/04
(52) U.S. Cl. ....... 518/721; 518/715; 518/719; 585/502; 585/510; 585/529
(58) Field of Search ................ 518/715, 719, 518/721; 585/502, 510, 529

(56) References Cited

U.S. PATENT DOCUMENTS

| | | | |
|---|---|---|---|
| 4,417,088 A | | 11/1983 | Miller |
| 4,617,320 A | * | 10/1986 | Coughlin et al. ............ 518/719 |
| 4,639,431 A | | 1/1987 | Gates et al. |
| 4,686,317 A | * | 8/1987 | Quann et al. ............... 585/860 |
| 4,994,428 A | | 2/1991 | Bell et al. |
| 5,100,856 A | | 3/1992 | Soled et al. |
| 5,135,638 A | | 8/1992 | Miller |
| 5,282,958 A | | 2/1994 | Santilli et al. |
| 5,463,158 A | | 10/1995 | Goledzinowski et al. |
| 5,500,449 A | | 3/1996 | Benham et al. |
| 5,506,272 A | | 4/1996 | Benham et al. |
| 5,543,437 A | | 8/1996 | Benham et al. |
| 5,866,748 A | | 2/1999 | Wittenbrink et al. |
| 6,080,301 A | | 6/2000 | Berlowitz et al. |
| 6,090,989 A | | 7/2000 | Trewella et al. |

FOREIGN PATENT DOCUMENTS

WO    WO 98/34998    8/1998

OTHER PUBLICATIONS

Bukur et al., Chemical Abstract (DN:132:239201),Supported iron catalyst for Fischer–Tropsch synthesis, American Chemical. Society, division of petroleum chemistry (2000), 45 (2), 218–220.*

Miller, S.J., "New Molecular Sieve Process for Lube Dewaxing by Wax Isomerization", Microporous Materials 2 (1994) 439–449.

Miller, S.J., "Studies on Wax Isomerization for Lubes and Fuels" in Zeolites and Related Microporous Materials: State of the Art 1994, Studies in Surface Science and Catalysis, vol. 84 (1994) 2319–2326.

Jager, B. et al., "Advances in Low Temperature Fischer–Tropsch Synthesis", Catalysis Today 23 (1995) 17–28.

Miller, S.J., "Wax Isomerization for Improved Lube Oil Quality", 1st Intl. on Refining Processing, AIChE, New Orleans, 1998.

* cited by examiner

*Primary Examiner*—J. Parsa
(74) *Attorney, Agent, or Firm*—James W. Ambrosius

(57) ABSTRACT

Process for increasing the branching in products from a slurry-type Fischer-Tropsch unit by use of potassium promoted iron-based catalyst, an integrated process for increasing the yield of lubricating base oils, and an iron-based Fischer-Tropsch catalyst composition having a high atomic ratio of potassium promoter.

19 Claims, 2 Drawing Sheets

PROCESS FOR THE PRODUCTION OF HIGHLY BRANCHED FISCHER-TROPSCH PRODUCTS AND POTASSIUM PROMOTED IRON CATALYST

CROSS REFERENCE TO RELATED APPLICATIONS

This application is a continuation-in-part of U.S. patent application Ser. No. 10/080,148, filed Feb. 19, 2002 now abandoned and is also related to Applicants' co-pending patent application Ser. No. 10/080,213, filed Feb. 19, 2002 titled "Process for Producing C-19 Minus Fischer-Tropsch Products Having High Olefinicity", the entire contents being incorporated herein by reference.

FIELD OF THE INVENTION

The present invention relates to the production of highly branched products from a slurry-type Fischer-Tropsch unit, an integrated process for increasing the yield of lube base oils, and a novel potassium promoted iron catalyst.

BACKGROUND OF THE INVENTION

The market for lubricating base oils of high paraffinicity is continuing to grow due to the high viscosity index, oxidation stability, and low volatility relative to viscosity of these molecules. Feedstocks having these preferred properties include the waxy products produced from the Fischer-Tropsch process which make them ideal candidates for processing into lube base stocks. Accordingly, the hydrocarbon products recovered from the Fischer-Tropsch process have been proposed as feedstocks for preparing high quality lube base oils. Because these waxy feeds have a high pour point, they must be dewaxed to low pour point to meet base oil specifications. See, for example, U.S. Pat. No. 6,080,301 which describes a premium lube base oil having a high non-cyclic isoparaffin content prepared from Fischer-Tropsch waxes by hydroisomerization dewaxing and solvent dewaxing. The dewaxing operation improves the pour point of the product. Unfortunately, when catalytic dewaxing is used a significant amount of wax cracking will usually take place during the dewaxing operation. This wax cracking which occurs in association with the catalytic dewaxing process cracks the molecules into lower molecular weight products, and, consequently, the final yield of lube base oil suffers. In order to limit the loss of the commercially valuable lube base oil product, it is usually desirable to operate the catalytic dewaxing unit at the lowest severity which will produce the product having the desired viscosity index and pour point.

As discussed in U.S. Pat. No. 6,090,989, the degree of branching present on the molecule and the position of the branches have a significant impact on the properties of the lube base stock. In general, the greater degree of branching in the product recovered from the Fischer-Tropsch unit, the less severe the dewaxing operation must be in order to produce lube base oils having the desired properties. Accordingly, in order to maximize the yield of lube base oils, it is advantageous to operate the Fischer-Tropsch unit in a mode which maximizes the branching of the products. The ability to increase the molecular branching is not only advantageous for increasing the yield of lube base oils, but also benefits the lighter cuts derived from the Fischer-Tropsch product. For example, branching in Fischer-Tropsch derived naphtha will increase the octane rating, branching in Fischer-Tropsch derived jet will improve the freeze point, and branching in Fischer-Tropsch derived diesel is known to improve the pour point. See U.S. Pat. No. 5,506,272.

The type of branching present in the carbon backbone of the molecules is important in determining the properties of the lube base oil product. See S. J. Miller, *Wax Isomerization for Improved Lube Oil Quality*, 1 st Intl. Conf. on Refining Processing, AlChE, New Orleans (1998). Significant deviation from the ideal branch structure will usually result in a loss of benefit. For those Fischer-Tropsch products which are intended as feed for a hydrocracking operation an additional advantage for the presence of branching is that the branching renders the molecule easier to crack.

Several commercial methods are used to provide the desired branching in the hydrocarbon molecules recovered from the Fischer-Tropsch process. The high temperature Fischer-Tropsch process which is carried out in the vapor phase will produce lower molecular weight olefinic products within the $C_3$ to $C_8$ range. The olefinic products of the high temperature Fischer-Tropsch process may be sent through oligomerization and hydrogenation steps which will produce a highly branched iso-paraffinic product. The products recovered from the high temperature Fischer-Tropsch process may contain a significant amount of branching. However, the high temperature Fischer-Tropsch process is not ideal for producing higher molecular weight products in the lubricating base oil boiling ranges. As already noted, the majority of the hydrocarbons produced are within the $C_3$ to $C_8$ range. In order to produce hydrocarbons in the molecular weight range of lubricating base oils almost all of the products must be sent through an oligomerization operation. In addition, the product from the high temperature Fischer process will usually contain significant amounts of aromatics which must be removed in order to prepare a high quality lube base oil.

In contrast to the high temperature Fischer-Tropsch process, the low temperature Fischer-Tropsch process, which is conducted in the liquid phase, will yield higher molecular weight products with low branching, with lower olefinicity than the high temperature Fischer-Tropsch process, and with virtually no aromatics. While the low temperature Fischer-Tropsch process will produce products within the lube base oil boiling range, due to the low level of branching, such products do not possess the desired low pour point characteristics. In order to meet these desired values for the products, a catalytic dewaxing operation is usually necessary in order to introduce the proper branching into the molecule. The relatively severe conditions at which the catalytic dewaxing unit must be operated results in a significant yield loss of the higher molecular weight products due to wax cracking. In addition, since the products derived from a low temperature Fischer-Tropsch operation have lower olefinicity, there will be fewer olefins to oligomerize to lube and consequently a lower lube yield or, alternatively, a dehydrogenation step will be needed to increase the olefin level of the Fischer-Tropsch products.

While a Fischer-Tropsch reaction may be suitably conducted in either a fixed bed reactor, slurry bed reactor, or a fluidized bed reactor, fixed bed reactors and slurry bed reactors are preferred for low temperature Fischer-Tropsch processes. Fluidized bed reactors are preferred for high temperature Fischer-Tropsch processes. Although the low temperature Fischer-Tropsch process is generally considered as being carried out at a temperature between 160 degrees C. and 250 degrees C. while the high temperature Fischer-Tropsch process is usually conducted at temperatures between 250 degrees C. and 375 degrees C., in actuality, the temperature range for the two processes will overlap. A good comparison of the high temperature and low temperature Fischer-Tropsch processes is presented in B. Jager and R.

Espinoza, *Advances in Low Temperature Fischer-Tropsch Synthesis, Catalysts Today* 23 (1995) pp 17–28.

Precipitated iron catalysts promoted with potassium have been described in the literature for use in Fischer-Tropsch synthesis. However, U.S. Pat. No. 4,994,428 teaches that the amount of potassium present should be limited to less than 0.6 weight percent. Higher levels of potassium are taught to offer no benefit in selectivity and to increase the production of undesirable oxygenated by-products. Copper is known to serve as an induction promoter, i.e., reduce the catalytic induction period, in a slurry-type potassium promoted iron catalyst. Copper and potassium promoted iron catalysts have been described in the literature as being selective for alpha olefins. See U.S. Pat. No. 5,100,856. U.S. Pat. No. 4,639,431 describes an iron/zinc Fischer-Tropsch catalyst promoter with copper which is useful for producing olefins.

U.S. Pat. No. 4,617,320 describes a potassium promoted iron catalyst containing a SAPO which is taught as useful for promoting branching in Fischer-Tropsch derived products boiling in the range of transportation fuels.

The dual catalyst composition taught in this reference is a pelleted catalyst that is intended for use in a fixed bed and, consequently, would not be suitable for use in a slurry-type Fischer-Tropsch synthesis process.

The present invention utilizes a novel iron-based Fischer-Tropsch catalyst promoted with very high levels of potassium which allow the Fischer-Tropsch unit to produce products having increased branching as compared to conventional slurry-type Fischer-Tropsch operations. In addition, by varying the amount of potassium promoter it is also possible to make products with increased olefinicity as compared to the conventional low temperature Fischer-Tropsch process. An advantage of the present invention over conventional high temperature Fischer-Tropsch processes is that the products contain very low levels of aromatics. This invention makes it possible to design an integrated process which maximizes the yield of high value lube base oil or, if desired, maximize the production of high quality transportation fuels, such as diesel and jet. As such, it combines the best features of both the low temperature and high temperature Fischer-Tropsch processes and offers greater flexibility for the plant design and product slate than has hitherto been possible.

As used in this disclosure the words "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrases "consisting of" or "consists of" are intended as a transition meaning the exclusion of all but the recited elements with the exception of only minor traces of impurities.

BRIEF DESCRIPTION OF THE INVENTION

In its broadest aspect the present invention is directed to a process for preparing a $C_5$ plus product with high branching from a slurry-type Fischer-Tropsch unit comprising (a) contacting a synthesis gas feed stock in a Fischer-Tropsch reaction zone with a potassium promoted iron catalyst under slurry-type Fischer-Tropsch reaction conditions, wherein the catalyst is prepared by the co-precipitation of iron and silica and the atomic ratio of iron to potassium in the catalyst is within the range of about 3 to about 15 atoms of potassium per 100 atoms of iron and (b) recovering from the Fischer-Tropsch reaction zone a $C_5$ plus Fischer-Tropsch product having at least 20 mole percent branching. Preferably, the atomic ratio of iron to potassium in the catalyst is within the range of about 3 to about 10 atoms of potassium per 100 atoms of iron. In addition, it is preferred that the catalyst be substantially free of alumina.

As will be explained in greater detail below, by maximizing the amount of branching in the Fischer-Tropsch products, the present invention makes an integrated process possible in which it is possible to maximize the production of lube base oils. In addition, the process of the present invention makes possible the production of middle distillates from the Fischer-Tropsch process which display improved properties over those middle distillates prepared from typical low temperature slurry-type Fischer-Tropsch processes. The present invention is especially useful for producing high yields of branched hydrocarbons boiling in the range of diesel. Further, the process of the present invention produces products having very low aromatics.

As used in this disclosure, the term "$C_{19}$ minus Fischer-Tropsch product" refers to a product recovered from a Fischer-Tropsch reaction zone which is predominantly comprised of hydrocarbons having 19 carbon atoms or less in the molecular backbone. One skilled in the art will recognize that such products may actually contain a significant amount of hydrocarbons containing greater than 19 carbon atoms. In general, what is referred to are those hydrocarbons having a boiling range of diesel and below. In general, for the purposes of this disclosure, diesel is considered as having a upper boiling point of about 700 degrees F. (370 degrees C.) and an initial boiling point of about 300 degrees F. (about 150 degrees C.). Diesel may also be referred to as $C_{10}$ to $C_{19}$ hydrocarbons. Likewise, the term "$C_{20}$ plus product" refers to a product comprising primarily hydrocarbons having 20 carbon atoms or more in the backbone of the molecule and having an initial boiling point at the upper end of the boiling range for diesel, i.e., above about 650 degrees F. (340 degrees C.). Such products are often referred to as residuum, which includes both vacuum residuum and atmospheric residuum, since such products will typically make up the bottoms from the distillation column. It should be noted that the upper end of the boiling range for diesel and the lower end of the boiling range for residuum have considerable overlap. The term "naphtha" when used in this disclosure refers to a liquid product having between about $C_5$ to about $C_9$ carbon atoms in the backbone and will have a boiling range generally below that of diesel but wherein the upper end of the boiling range will overlap that of the initial boiling point of diesel. Products recovered from the Fischer-Tropsch synthesis which are normally in the gaseous phase at ambient temperature are referred to as $C_4$ minus product in this disclosure. The precise cut-point selected for each of the products in carrying out the distillation operation will be determined by the product specifications and yields desired.

The present invention is further directed to a catalyst composition suitable for use in a slurry-type Fischer-Tropsch reactor which comprises a particulate potassium promoted iron-based catalyst wherein the atomic ratio of iron to potassium is within the range of from about 3 to about 15 atoms of potassium to 100 atoms of iron. It has been found that by varying the ratio of potassium promoter to iron within the aforesaid range the yield of branched products or olefinic products may be maximized. In order to maximize the amount of branching in the Fischer-Tropsch products the atomic ratio of potassium to iron is preferably within the range of about 3 to about 10 atoms of potassium to each 100 atoms of iron. Conversely, in order to maximize the olefinicity of the product, the preferred atomic ratio of potassium to iron is within the range of from about 3 to about 7 atoms of potassium for each 100 atoms of iron. In addition, the catalyst composition will preferably contain from about 0.1 to about 3 atoms of copper per 100 atoms of iron.

As already noted above, the catalyst of the present invention is prepared by the co-precipitation of silica and iron. Preferably, the catalyst will be substantially free of alumina. "Substantially free of alumina" means the absence of alumina in the catalyst composition except for trace amounts which may be present as a contaminant. The presence of acid functionality in the catalyst leads to instability of the catalyst and rapid deactivation, therefore the presence of alumina is undesirable.

DETAILED DESCRIPTION OF THE INVENTION

Figure 1:
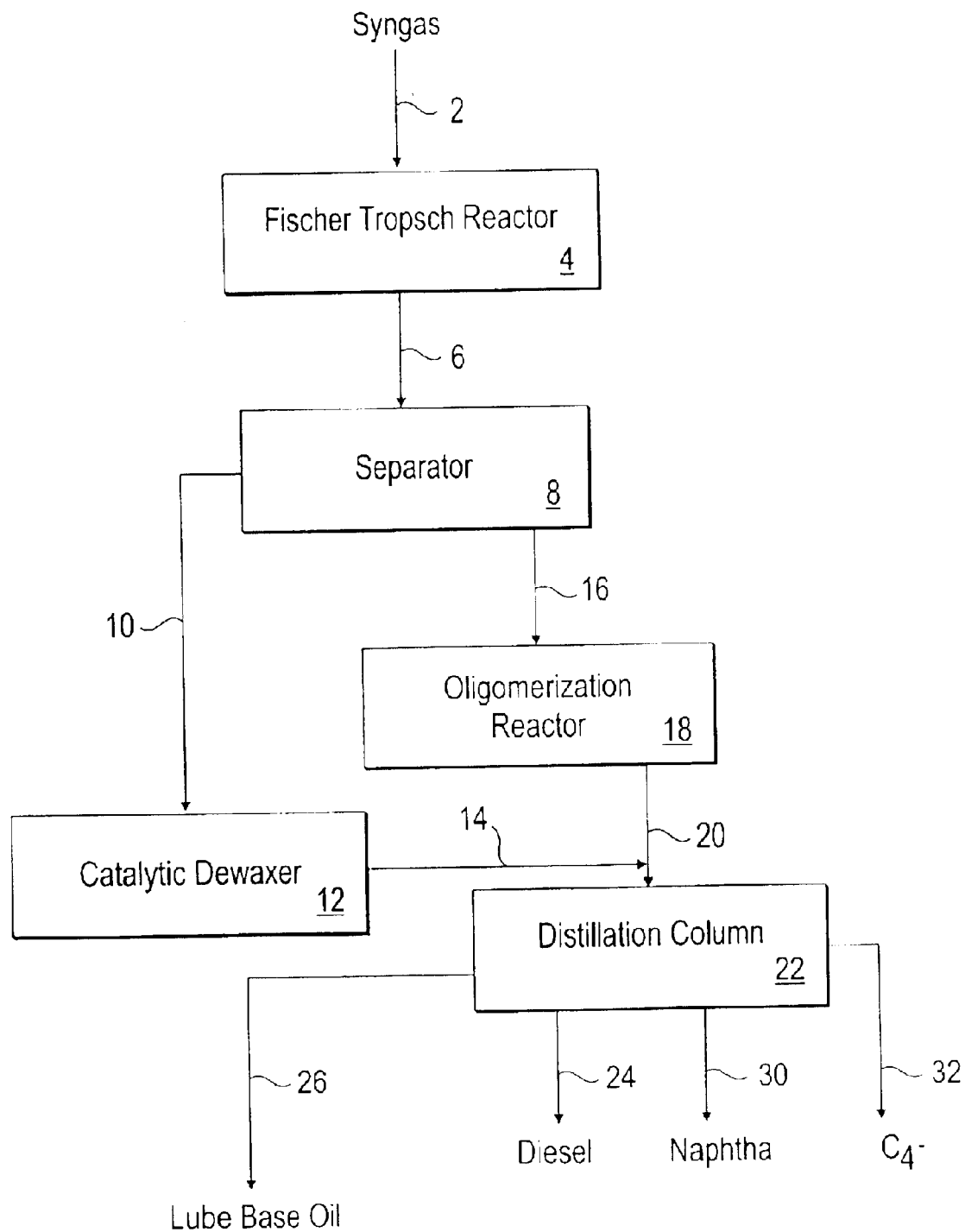
FIG. 1 is a schematic diagram of one embodiment of the present invention which illustrates an integrated process for maximizing the production of diesel and lube base oils.

The present invention will be more clearly understood by reference to the FIG. 1 which illustrates one embodiment of the invention. Synthesis gas or syngas which is a mixture comprising carbon monoxide and hydrogen is shown in the drawing as feed stream 2 entering the slurry-type Fischer-Tropsch reactor 4. In the Fischer-Tropsch reactor the syngas is contacted with an iron-based Fischer-Tropsch catalyst promoted with potassium. As will be explained more fully below the atomic ratio of potassium promoter to iron for the Fischer-Tropsch catalyst present in slurry-type Fischer-Tropsch reactor 4 will preferably be within the range of from about 3 atoms to about 10 atoms of potassium to each 100 atoms of iron in order to maximize the branching in the products. The Fischer-Tropsch product is collected in product stream 6 and sent to separator 8 where the $C_{19}$ minus product is separated from the $C_{20}$ plus product. The $C_{20}$ plus product which is collected from the separator 8 in line 10 will have at least 20 mole percent branching. The $C_{20}$ plus Fischer-Tropsch product is carried to the catalytic dewaxer 12, preferably a hydroisomerization dewaxing unit. The $C_{20}$ plus product collected from the Fischer-Tropsch reactor is more highly branched than the $C_{20}$ plus product recovered from a conventional slurry-type Fischer-Tropsch reactor. Therefore, the catalytic dewaxer may be run at less severe conditions than would normally be necessary. Consequently, less wax cracking will occur, and the yield of lube base oils having the desired viscosity characteristics which are recovered via line 14 is increased when compared to the lube yield in a conventional Fischer-Tropsch/hydrodewaxing operation.

Returning to the separator 8, the $C_{19}$ minus product is recovered from the separator by means of line 16. The $C_{19}$ minus product will also have a higher olefinicity than would normally be achieved in a conventional slurry-type Fischer-Tropsch synthesis. The $C_{19}$ minus product is carried by line 16 to the oligomerization reactor 18 where the olefins in the product are oligomerized to form heavier hydrocarbons. Although the figure shows essentially all of the $C_{19}$ minus product going to the oligomerization reactor, one skilled in the art will recognize that in practice it may be desired that only part of the $C_{19}$ minus product be sent to the oligomerization reactor. The oligomerization product is carried by conduit 20 to distillation column 22 where the various cuts are separated. Preferably, the majority of the products recovered from the distillation column 22 will be cuts boiling in the diesel and lubricating base oil range. The diesel cut is shown as being collected in product outlet 24, and the product cut boiling in the range of lubricating base oil is shown as being collected in product outlet 26. Lubricating base oil carried by line 14 from the catalytic dewaxer 12 and by conduit 20 from the oligomerization reactor 18 are shown as being mixed together and collected in conduit 20 prior to entering the distillation column 22. Since the lubricating base oil recovered from the oligomerization reactor will contain branching as a result of the oligomerization operation, it is unnecessary to pass it through a catalytic dewaxing operation. Product cuts containing naphtha and $C_4$ minus hydrocarbons are shown as being collected by outlet conduits 30 and 32, respectively. Since the entire process is operated to maximize the heavier product cuts, that is, lubricating base oils and diesel, minimal $C_4$ minus hydrocarbons would be expected to be recovered.

Synthesis Gas Feedstock

Natural gas which may be employed to generate the synthesis gas (syngas) used as a feedstock for the Fischer-Tropsch process is an abundant fossil fuel resource. The composition of natural gas at the wellhead varies, but the major hydrocarbon present is methane. For example the methane content of natural gas may vary within the range of from about 40 to 95 volume percent. Other constituents of natural gas may include ethane, propane, butanes, pentane (and heavier hydrocarbons), hydrogen sulfide, carbon dioxide, helium and nitrogen. It is also possible to use methane derived from other sources in the process of the present invention. Methane can be derived from a variety of sources such as the fuel gas system, the gasification of heavy hydrocarbonaceous materials, such as may be found in coal, coker bottoms, and residuum, renewable resources such as biomass, or even the reduction of methanol.

The synthesis gas used to carry out the present invention can be generated from methane using steam reforming, partial oxidation or gasification, or a combined reforming and autothermal reforming process. All of these reforming processes have been described in the literature and are well known to those skilled in the art. In carrying out the present invention, it is preferred that the volume ratio of hydrogen to carbon monoxide in the syngas be within the range of from about 0.5 to about 2.5 with a range of from about 0.5 to about 1.0 being preferred.

Typically, synthesis gas contains hydrogen and carbon monoxide, and may include minor amounts of carbon dioxide and/or water. Common contaminants include sulfur, nitrogen, halogen, selenium, phosphorus and arsenic. It is preferred to remove sulfur and other contaminants from the feed before performing the Fischer-Tropsch chemistry. Means for removing these contaminants are well known to those of skill in the art. For example, ZnO guard beds are preferred for removing sulfur impurities. Sulfur is a poison for most Fischer-Tropsch catalysts, including the catalyst used in the present invention, and it is preferred that the maximum sulfur content of the syngas not exceed about 0.2 ppm in a commercial Fischer-Tropsch operation.

Fischer-Tropsch Catalyst

The catalyst used to carry out the Fischer-Tropsch reaction is a potassium promoted iron-based catalyst prepared by the co-precipitation of iron and silica. Although potassium promoted iron-based catalysts have been described in the literature for use in slurry-type Fischer-Tropsch reactors, the amount of potassium present in the prior processes is significantly below that used in the Fischer-Tropsch catalyst of this invention. See, for example, U.S. Pat. No. 4,994,428 where the amount of potassium promoter is limited to no more than 0.6 weight percent in order to prevent the formation of undesirable oxygenates.

The presence of acid sites on the catalyst will lead to the deactivation of the catalyst over time. Therefore, the catalyst preferably will contain substantially no alumina. Co-precipitated catalysts of the present invention in the substantial absence of alumina have demonstrated good stability.

For the catalyst composition of the present invention, the atomic ratio of potassium to iron will be within the range of from about 3 atoms to about 15 atoms of potassium to each 100 atoms of iron. Within the foregoing ratio limitations of the catalyst, the potassium to iron atomic ratio may be adjusted to optimize either the production of highly branched product or highly olefinic product. Within the range of from about 3 atoms to about 7 atoms of potassium to each 100 atoms of iron, the catalyst composition when used to catalyze the Fischer-Tropsch process will maximize the production of olefins. At a slightly higher atomic ratio of potassium to iron, it has been found that the production of branched hydrocarbons increases somewhat while the amount of olefinic hydrocarbons decreases. Therefore, in order to maximize the production of branched material when practicing the present invention, the atomic ratio preferably should be within the range of from about 3 atoms to about 10 atoms of potassium to each 100 atoms of iron. Of course, within the broad limitations of the composition of the catalyst more branched product and olefinic product will be produced than would be obtained using a conventional iron-based slurry catalyst. By optimally adjusting the atomic ratio of potassium to iron, the production of either olefins or branched hydrocarbons is maximized.

Even when the atomic ratio is adjusted to maximize the production of branched hydrocarbons, the $C_{19}$ minus product recovered from the Fischer-Tropsch reactor will have increased olefinicity in comparison to the $C_{19}$ minus product recovered from a conventional low temperature slurry-type reactor. In a similar manner, if the atomic ratio of potassium to iron is adjusted to maximize the olefinicity of the $C_{19}$ minus Fischer Products, increased branching of the heavier hydrocarbons will be observed as compared to conventional slurry-type Fischer-Tropsch processes.

Preferably, the catalyst will also contain an induction promoter, such as, for example, copper. Copper when used as the induction promoter preferably should be present in an atomic ratio of from about 0.1 to about 3 atoms of copper per 100 atoms of iron. In the preferred composition, the catalyst also will contain between about 1 and about 10 atoms of silicon for each 100 atoms of iron present.

The general means for preparing potassium promoted iron-based Fischer-Tropsch catalysts of the present invention which will be suitable for use in slurry-type reactors is known to those skilled in the art, and the method for preparing catalysts of this general type has been described in the literature. See U.S. Pat. Nos. 5,506,272; 5,100,856; and 4,994,428. In general, a solution is prepared containing the iron and copper, usually through dissolution of the elemental metals in nitric acid to form the corresponding nitrate. A catalyst precursor is formed by the precipitation of the metal oxides from the nitrate solution using an alkali, such as an aqueous solution of ammonium hydroxide. The catalyst precursor is washed and the potassium promoter added, usually in the form of dissolved potassium carbonate. The resulting slurry is spray-dried and calcined. Prior to use, the catalyst is activated in a reducing and/or carbiding atmosphere at an elevated temperature. Of course, the catalyst compositions of the present invention have not been previously described in the literature. Catalysts intended for use in slurry-type Fischer-Tropsch reactors will generally have a particle size between about 30 microns and about 150 microns, with a particle size between about 80 microns and about 120 microns being preferred. A particle size smaller than about 30 microns will be too difficult to separate from the product to be of practical use in a commercial process. Particles sizes in excess of about 150 microns will generally settle out of the reaction mixture too quickly to be practical.

The preparation of specific catalyst compositions used to carry out the present invention are described in greater detail in the examples given below.

Fischer-Tropsch Synthesis

The reaction conditions under which the Fischer-Tropsch synthesis is carried out are those of a typical slurry-type operation, as opposed to a fixed bed or a fluidized bed operation. The reaction proceeds in the liquid phase at a temperature within the range of from about 200 degrees C. to about 300 degrees C., preferably between about 210 degrees C. to about 250 degrees C. The reactor pressure will be within the range of from about 100 psig to about 400 psig, with between about 170 psig to about 300 psig being preferred. The catalyst space velocity, based upon the amount of iron, will fall within the range of from about 2 L/gr Fe/hr to about 20 L/gr Fe/hr, with a range of from about 3 L/gr Fe/hr to about 7 L/gr Fe/hr being preferred. While the Fischer-Tropsch operation used to carry out the present invention is sometimes referred to as a low temperature Fischer-Tropsch process, it is preferable to refer to the process as a slurry-type process. Rather than temperature alone being the critical reaction parameter in carrying out the process, it is important that the process be maintained in the liquid phase. Accordingly, the combination of temperature and pressure becomes the critical consideration in performing the operation. In a slurry bed reactor the catalyst/liquid phase mixture is continuously agitated by the feed gas passing upward in generally plug flow through the reactor resulting in efficient contact between the feed gas and the catalyst.

Carried out according to the limitations presented in this disclosure, excellent chain growth of the hydrocarbon molecules has been observed. Carbon number selectivity or chain growth probability has been expressed in the literature as alpha value. See M. E. Dry, *The Fischer-Tropsch Synthesis*. Catalysis Science and Technology, Vol. 1 Springer-Verlag (1981). Using this method, alpha values in excess of 0.85 have been observed. In addition, when carried out according to the present invention, the products recovered from the Fischer-Tropsch reactor contain very low oxygenates, typically 5% or less, and contain virtually no aromatics.

By employing the process of the present invention, branching in excess of 20 mole percent has been achieved in the $C_5$ plus hydrocarbons. In the diesel fraction the branching preferably will be at least 25 mole percent and even more preferably at least 30 mole percent. This is a significant departure from what has been observed in conventional low temperature slurry-type Fischer-Tropsch operations where the $C_5$ plus products typically have less than 10 mole percent branching.

Oligomerization

As already noted, the present invention is intended to maximize the production of branching in the $C_5$ plus hydrocarbons, i.e., those hydrocarbons having boiling ranges for naphtha and above. However, as also noted, significant olefinicity will be present in those hydrocarbons within the $C_5$ to $C_{19}$ range. If desired, these $C_5$ to $C_{19}$ hydrocarbons may be oligomerized in an oligomerization operation to form heavier hydrocarbons. Prior to oligomerization, it is usually desirable to send the products from the Fischer-Tropsch reactor through a dehydration/guard bed step in order to convert certain of the oxygenates, mostly alcohols, to olefins, and to remove heteroatoms and water. Following oligomerization, the carbon backbone of the oligomers will also display branching at the points of molecular addition. The oligomerization of olefins has been well reported in the literature and a number of commercial processes are available. See, for example, U.S. Pat. Nos. 4,417,088; 4,827,064; 4,827,073; and 4,990,709.

Preferably, the oligomerized product will have an average molecular weight at least 10% higher than the initial feedstock, preferably at least 20% higher. The oligomerization reaction will proceed over a wide range of conditions. Typical temperatures for carrying out the reaction are between room temperature and 400 degrees F. Other conditions include from 0.1 to 3 LHSV and from 0 to 500 psig. Catalysts for the oligomerization reaction can be virtually any acidic material, such as, for example, zeolites, clays, resins, $BF_3$ complexes, HF, $H_2SO_4$, $AlCl_3$, ionic liquids, superacids, and the like.

The high olefinicity of the $C_5$ to $C_{19}$ hydrocarbons makes it possible to readily upgrade the product slate recovered from the Fischer-Tropsch reactor to higher molecular weight and higher value products, such as high quality lubricating base oils and diesel. In addition, due to the introduction of branching into the molecule the viscosity and pour point properties of the products are enhanced making them excellent candidates for blending components to upgrade lower quality conventional petroleum-derived products to meet market specifications.

Catalytic Dewaxing

Catalytic dewaxing consists of three main classes, conventional hydrodewaxing, complete hydroisomerization dewaxing, and partial hydroisomerization dewaxing. All three classes involve passing a mixture of a waxy hydrocarbon stream and hydrogen over a catalyst that contains an acidic component to convert the normal and slightly branched iso-paraffins in the feed to other non-waxy species, such as lubricating base oil stocks with acceptable pour points. Typical conditions for all classes involve temperatures from about 400 degrees F. to about 800 degrees F. (200 degrees C. to 425 degrees C.), pressures from about 200 psig to 3000 psig, and space velocities from about 0.2 to 5 $hr^{-1}$. The method selected for dewaxing a feed typically depends on the product quality, and the wax content of the feed, with conventional hydrodewaxing often preferred for low wax content feeds. The method for dewaxing can be effected by the choice of the catalyst. The general subject is reviewed by Avilino Sequeira, in *Lubricant Base Stock and Wax Processing*, Marcel Dekker, Inc. pages 194–223. The determination between conventional hydrodewaxing, complete hydroisomerization dewaxing, and partial hydroisomerization dewaxing can be made by using the n-hexadecane isomerization test as described in U.S. Pat. No. 5,282,958. When measured at 96 percent, n-hexadecane conversion using conventional hydrodewaxing catalysts will exhibit a selectivity to isomerized hexadecanes of less than 10 percent, partial hydroisomerization dewaxing catalysts will exhibit a selectivity to isomerized hexadecanes of greater than 10 percent to less than 40 percent, and complete hydroisomerization dewaxing catalysts will exhibit a selectivity to isomerized hexadecanes of greater than or equal to 40 percent, preferably greater than 60 percent, and most preferably greater than 80 percent.

In conventional hydrodewaxing, the pour point is lowered by selectively cracking the wax molecules mostly to smaller paraffins using a conventional hydrodewaxing catalyst, such as, for example ZSM-5. Metals may be added to the catalyst, primarily to reduce fouling. In the present invention conventional hydrodewaxing may be used to increase the yield of lower molecular weight products in the final product slate by cracking the Fischer-Tropsch wax molecules.

Complete hydroisomerization dewaxing typically achieves high conversion levels of wax by isomerization to non-waxy iso-paraffins while at the same time minimizing the conversion by cracking. Since wax conversion can be complete, or at least very high, this process typically does not need to be combined with additional dewaxing processes to produce a lubricating base oil stock with an acceptable pour point. Complete hydroisomerization dewaxing uses a dual-functional catalyst consisting of an acidic component and an active metal component having hydrogenation activity. Both components are required to conduct the isomerization reaction. The acidic component of the catalysts used in complete hydroisomerization preferably includes an intermediate pore SAPO, such as SAPO-11, SAPO-31, and SAPO-41, with SAPO-11 being particularly preferred. Intermediate pore zeolites, such as ZSM-22, ZSM-23, and SSZ-32, also may be used in carrying out complete hydroisomerization dewaxing. Typical active metals include molybdenum, nickel, vanadium, cobalt, tungsten, zinc, platinum, and palladium. The metals platinum and palladium are especially preferred as the active metals, with platinum most commonly used.

In partial hydroisomerization dewaxing a portion of the wax is isomerized to iso-paraffins using catalysts that can isomerize paraffins selectively, but only if the conversion of wax is kept to relatively low values (typically below 50 percent). At higher conversions, wax conversion by cracking becomes significant, and a yield loss of lubricating base oil stock becomes uneconomical. Like complete hydroisomerization dewaxing, the catalysts used in partial hydroisomerization dewaxing include both an acidic component and a hydrogenation component. The acidic catalyst components useful for partial hydroisomerization dewaxing include amorphous silica aluminas, fluorided alumina, and I2-ring zeolites (such as Beta, Y zeolite, L zeolite). The hydrogenation component of the catalyst is the same as already discussed with complete hydroisomerization dewaxing. Because the wax conversion is incomplete, partial hydroisomerization dewaxing must be supplemented with an additional dewaxing technique, typically solvent dewaxing, complete hydroisomerization dewaxing, or conventional hydrodewaxing in order to produce a lubricating base oil stock with an acceptable pour point (below about +10 degrees F. or −12 degrees C.).

In preparing those catalysts containing a non-zeolitic molecular sieve and having an hydrogenation component for use in the present invention, it is usually preferred that the metal be deposited on the catalyst using a non-aqueous method. Catalysts, particularly catalysts containing SAPO's, on which the metal has been deposited using a non-aqueous method, have shown greater selectivity and activity than those catalysts which have used an aqueous method to deposit the active metal. The non-aqueous deposition of active metals on non-zeolitic molecular sieves is taught in U.S. Pat. No. 5,939,349. In general, the process involves dissolving a compound of the active metal in a non-aqueous, non-reactive solvent and depositing it on the molecular sieve by ion exchange or impregnation.

For the purposes of the present invention, hydroisomerization dewaxing, especially complete hydroisomerization dewaxing, is preferred over hydrodewaxing if such operation is able to provide the desired viscosity and pour point specifications for the product. This is because with less wax cracking, the yield of lubricating base oil will be increased. The preferred hydroisomerization catalyst for use in the catalytic hydroisomerization step comprises SAPO-11.

The following examples will further clarify the invention; however, they are not intended to be a limitation upon the scope of the invention.

EXAMPLES

Example 1

A catalyst (labeled Cat A) was prepared by mixing an aqueous solution containing iron nitrate and tetraethyl orthosilicate (Fe:Si=100:4.6) and concentrated ammonium hydroxide in a continuous stirred tank reactor so that the average residence time was about 6 minutes at a pH of about 9.0. The precipitate was collected by filtration and washed two times with distilled water. The washed solid was dried at 110 degrees C. in air and then calcined in air at 350 degrees C. for 4 hr. To prepare the preferred catalyst for the preparation of highly olefinic products, the solid was impregnated with an aqueous solution of potassium carbonate and copper nitrate to provide a final catalyst containing the atomic ratio of Fe:Si:K:Cu=100:4.6:5.0:2.0 and then dried at 110 degrees C. in air. A slurry was prepared in a CSTR autoclave using 32 g catalyst and 310 g of a $C_{30}$ oil obtained from Ethyl Corp. The catalyst was activated by heating the slurry to 110 degrees C. in helium for 4 hours and then ramping at 10 degrees/minute to 270 degrees C. in flowing CO and held at this temperature for 20 hours. Following activation the pressure was increased to 450 psig and the flows adjusted to give a ratio of $H_2/CO=1.7$ and a total flow rate of 22 normal liters/hour/gram iron. The reaction temperature was 230 degrees C. Samples were collected at intervals and analyzed using gas chromatography. Yield data is shown in Table I. Product samples were hydrogenated over platinum on carbon catalyst at room temperature and 30 psig to convert olefins to paraffins to simplify analysis of branching. Branching as a function of carbon number in the $C_{12}$ to $C_{18}$ range, as calculated from gas chromatography, is given in Table II. Weight percent isomer yield of each carbon number is equal to: (Percent iso) X (Wt % yield) for each carbon number. Note that while the yield of branched isomers diminishes at higher carbon number, the percentage of branching within each carbon number is close to 20% or above, even at $C_{18}$.

TABLE I

Yields (Wt %) in FT Synthesis

| Cat A | 450 psig, 230° C. | | SV = 22 sl/h/g-Fe | $H_2:CO = 1.7$ |
|---|---|---|---|---|
| Sample | A | B | C | average |
| $C_1$ | 6.63 | 6.25 | 5.70 | 6.2 |
| $C_2$ to $C_4$ | 34.01 | 30.92 | 28.50 | 31.1 |
| $C_5$ to $C_{11}$ | 32.08 | 39.99 | 40.20 | 37.4 |
| $C_{12}$ to $C_{18}$ | 22.73 | 20.24 | 22.20 | 21.7 |
| $C_{19+}$ | 4.55 | 2.61 | 3.40 | 3.5 |
| | | | Sum | 100.00 |

TABLE II

Isomer Yields for Cat A catalyst

| | Cat A iso % | Run A, wt % | Run B, wt % | Run C, wt % | avg wt % |
|---|---|---|---|---|---|
| $C_{12}$ | 25.38 | 4.615 | 4.689 | 4.574 | 4.626 |
| $C_{13}$ | 23.6 | 4.101 | 4.051 | 4.133 | 4.095 |
| $C_{14}$ | 23.46 | 3.741 | 3.441 | 3.676 | 3.619 |
| $C_{15}$ | 22.72 | 3.319 | 2.838 | 3.186 | 3.114 |
| $C_{16}$ | 21.09 | 2.801 | 2.255 | 2.717 | 2.591 |
| $C_{17}$ | 21.2 | 2.349 | 1.715 | 2.182 | 2.082 |
| $C_{18}$ | 19.12 | 1.805 | 1.250 | 1.736 | 1.597 |

Example 2

A similar catalyst (labeled Cat B) to that of Example 1 was prepared, except the K:Fe ratio was 1.4:100 instead of 5.0:100. This catalyst was run at a pressure of 175 psig, a temperature of 270 degrees C., and $H_2:CO$ ratio of 0.67, and a space velocity of 10 normal liters/hour/gram irons. Yields are given in Table III.

TABLE III

Yields with K/Fe catalyst of 1.4/100 mole ratio

| Cat B | 175 psig, 270° C | | SV = 10 sl/h/g-Fe | $H_2:CO = 0.67$ |
|---|---|---|---|---|
| Sample | D | E | F | Average |
| $C_1$ | 11.42 | 9.56 | 12.00 | 11.0 |
| $C_2$ to $C_4$ | 36.78 | 28.10 | 35.02 | 33.3 |
| $C_5$ to $C_{11}$ | 41.27 | 42.05 | 37.28 | 40.2 |
| $C_{12}$ to $C_{18}$ | 9.88 | 8.37 | 14.27 | 10.8 |
| $C_{19+}$ | 0.66 | 11.92 | 1.43 | 4.7 |
| | | | Sum | 100.00 |

Branching as a function of carbon number in the $C_{12}$ to $C_{18}$ range, as calculated from gas chromatography, is shown in Table IV.

TABLE IV

Isomer Yields for Cat B Catalyst

| | Cat B iso % | Run A, wt % | Run B, wt % | Run C, wt % | avg wt % |
|---|---|---|---|---|---|
| $C_{12}$ | 25.38 | 2.424 | 2.338 | 2.815 | 2.525 |
| $C_{13}$ | 25.73 | 2.057 | 1.846 | 2.572 | 2.158 |
| $C_{14}$ | 24.54 | 1.714 | 1.389 | 2.372 | 1.825 |

TABLE IV-continued

Isomer Yields for Cat B Catalyst

|  | Cat B iso % | Run A, wt % | Run B, wt % | Run C, wt % | avg wt % |
|---|---|---|---|---|---|
| $C_{15}$ | 25.55 | 1.382 | 1.003 | 2.163 | 1.516 |
| $C_{16}$ | 24.75 | 1.048 | 0.703 | 1.867 | 1.206 |
| $C_{17}$ | 27.49 | 0.760 | 0.629 | 1.474 | 0.954 |
| $C_{18}$ | 25.93 | 0.492 | 0.463 | 1.005 | 0.653 |

It should be noted that in comparing the results from Example 1 (Cat A) and Example 2 (Cat B) that although the branching in the $C_{12}$ to $C_{18}$ hydrocarbons was actually higher for Cat B, the actual yield of product was significantly less. Therefore, the actual yield of branched product in the $C_{12}$ to $C_{18}$ range was much greater for Cat A.

Example 3

Four different iron based catalysts were prepared using the general method described in Example 1 except that each catalyst contained a different atomic ration of potassium to iron. The atomic ratios of potassium to iron for each of the four catalysts were as follows:

| Cat C | 7.5 |
|---|---|
| Cat D | 5.0 |
| Cat E | 1.4 |
| Cat F | 0.0 |

Figure 2:
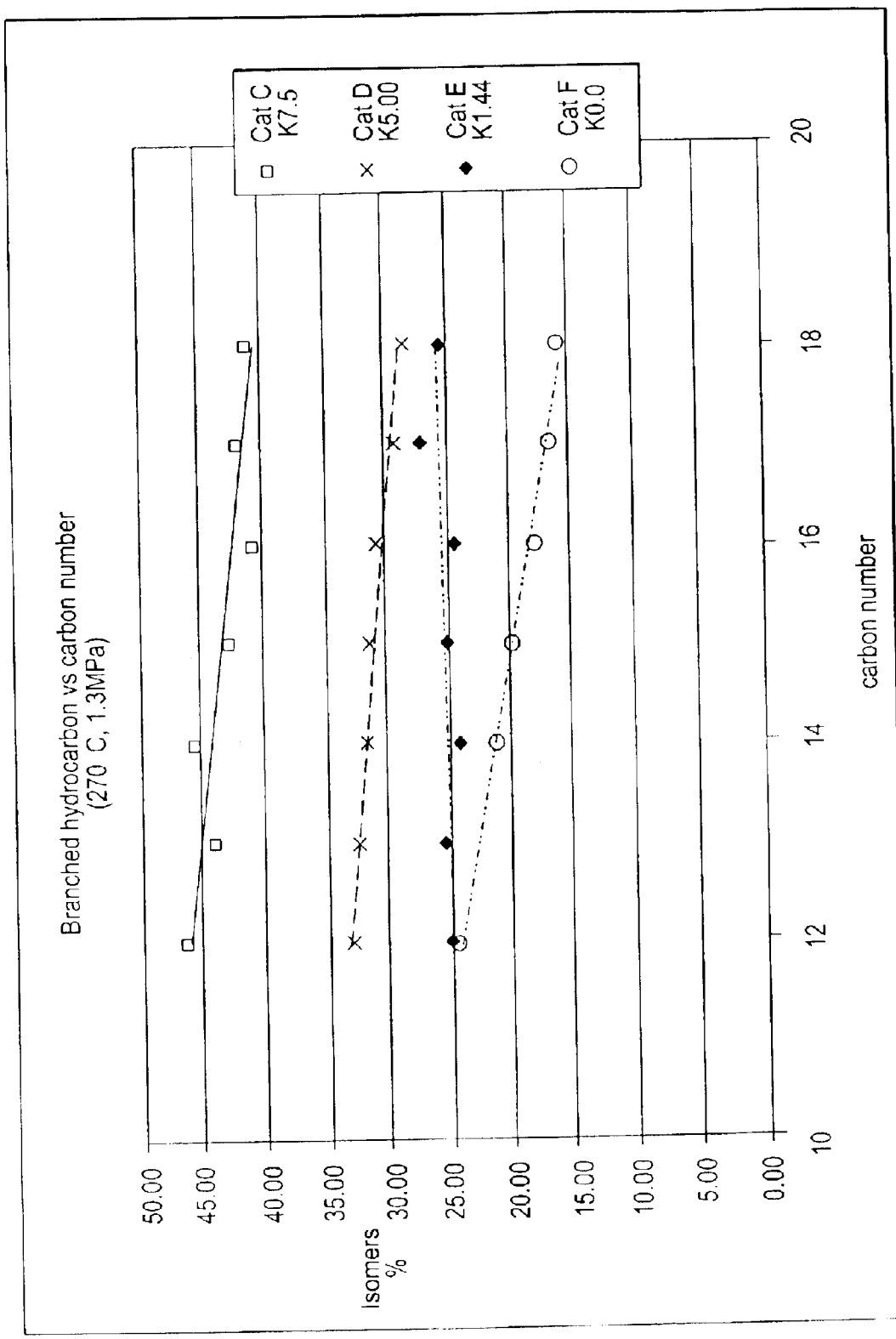
FIG. 2 is a graph which illustrates the performance of four different iron based catalysts containing different atomic ratios of potassium promoter.

Each catalyst was used to prepare Fischer-Tropsch products under the same conditions. The products boiling within the general range of diesel recovered from each Fischer-Tropsch synthesis were analyzed for branching. The results are shown in FIG. 2. It will be noted that the diesel produced using the catalyst with the highest atomic ratio of potassium to iron (Cat C) showed the highest level of branching. As the ratio decreased the amount of branching observed also decreased.

What is claimed is:

1. A process for preparing a $C_5$ plus product with high branching from a slurry-type Fischer-Tropsch unit comprising:
   (a) contacting a synthesis gas feed stock in a Fischer-Tropsch reaction zone with a potassium promoted iron catalyst that is substantially free of alumina under slurry-type Fischer-Tropsch reaction conditions, wherein the catalyst is prepared by the co-precipitation of iron and silica, the atomic ratio of iron to potassium in the catalyst is within the range of about 3 to about 15 atoms of potassium per 100 atoms of iron, the atomic ratio of iron to silicon in the catalyst is within the range of about 1 to about 10 atoms of silicon 100 atoms of iron, and the particle size is within the range of from about 30 microns and about 150 microns; and
   (b) recovering from the Fischer-Tropsch reaction zone a $C_5$ plus Fischer-Tropsch product having at least 20 mole percent branching.

2. The process of claim 1 wherein the reaction conditions in the Fischer-Tropsch reaction zone include a temperature of between about 200 degrees C. and about 300 degrees C., a pressure of between about 100 psig and about 400 psig and a iron catalyst space velocity between about 2 L/gr/hr and about 20 L/gr/hr.

3. The process of claim 2 wherein the reaction conditions in the Fischer-Tropsch reaction zone include a temperature of between about 210 degrees C. and about 250 degrees C., a pressure of between about 170 psig and about 300 psig and a iron catalyst space velocity between about 3 L/gr/hr and about 7 L/gr/hr.

4. The process of claim 1 wherein the volume ratio of hydrogen to carbon monoxide in the synthesis gas feed stock is within the range of from about 0.5 to about 2.5.

5. The process of claim 4 wherein the volume ratio of hydrogen to carbon monoxide in the synthesis gas feed stock is within the range of from about 0.5 to about 1.0.

6. The process of claim 1 wherein the atomic ratio iron to potassium in the catalyst is within the range of from about 3 and about 10 atoms of potassium to 100 atoms of iron.

7. The process of claim 1 wherein $C_5$ plus Fischer-Tropsch product recovered from the Fischer-Tropsch reaction zone contains less than about 5 weight percent of aromatics.

8. The process of claim 7 wherein $C_5$ plus Fischer-Tropsch product recovered from the Fischer-Tropsch reaction zone contains less than about 3 weight percent of aromatics.

9. The process of claim 1 wherein a product having an initial boiling point above about 340 degrees C. is separately recovered.

10. The process of claim 9 including the additional steps of hydroisomerizing the 340 degrees C. plus product and recovering a lube base oil.

11. The process of claim 1 wherein a diesel product is recovered from the Fischer-Tropsch reaction zone.

12. The process of claim 11 wherein the diesel product has at least 25 mole percent branching.

13. The process of claim 12 wherein the diesel product has at least 30 mole percent branching.

14. The process of claim 11 including the additional steps of contacting the diesel product with an oligomerization catalyst in an oligomerization zone under conditions selected to oligomerize the olefins in the diesel product and recovering a lube base oil product from the oligomerization zone.

15. The process of claim 1 wherein a naphtha product is recovered from the Fischer-Tropsch reaction zone.

16. The process of claim 15 including the additional steps of contacting the naphtha product with an oligomerization catalyst in an oligomerization zone under conditions selected to oligomerize the olefins in the naphtha product and recovering an oligomer product having a higher boiling point range from the oligomerization zone.

17. The process of claim 16 wherein the oligomer recovered from the oligomerization zone has an initial boiling point in excess of 340 degrees C.

18. The process of claim 1 wherein the alpha value in the Fischer-Tropsch reaction zone is at least 0.85.

19. The process of claim 1 wherein the particle size, of the catalyst is within the range of from about 80 microns to about 120 microns.

* * * * *